United States Patent

Ali-Khan

Patent Number: 5,925,405
Date of Patent: Jul. 20, 1999

[54] METHOD OF MANUFACTURING CERAMIC, METALLIC OR CERAMO-METALLIC, SHAPED BODIES AND LAYERS

[76] Inventor: Imran Ali-Khan, Artilleriestrasse 41, 52428 Jülich, Germany

[21] Appl. No.: 08/914,686

[22] Filed: Aug. 19, 1997

Related U.S. Application Data

[63] Continuation-in-part of application No. PCT/DE96/00288, Feb. 16, 1996.

[30] Foreign Application Priority Data

Feb. 21, 1995 [DE] Germany ............ 195 05 912

[51] Int. Cl.$^6$ ................. B05D 1/12; B05D 3/02
[52] U.S. Cl. .......... 427/180; 264/658; 264/669; 264/670; 419/38; 419/45; 427/228
[58] Field of Search ............ 264/658, 669, 264/670; 419/38, 45; 427/180, 228

[56] References Cited

U.S. PATENT DOCUMENTS

| | | | |
|---|---|---|---|
| 4,196,230 | 4/1980 | Gibson et al. | 427/228 |
| 4,595,545 | 6/1986 | Sane | 264/65 |
| 5,146,934 | 9/1992 | Deevi et al. | 131/359 |
| 5,364,522 | 11/1994 | Wang | 205/50 |

FOREIGN PATENT DOCUMENTS

| | | |
|---|---|---|
| 1 281 601 | 10/1968 | Germany . |
| 2 011 879 | 7/1979 | United Kingdom . |

*Primary Examiner*—Christopher A. Fiorilla
*Attorney, Agent, or Firm*—Klaus J. Bach

[57] ABSTRACT

In a method of manufacturing ceramic, metallic shaped bodies or layers a castable moldable material mass consisting of sugar and/or urea-containing compounds as well as metal components is produced and from that material mass a shaped body is formed or the material mass is applied to a material structure and the shaped body or material structure is then heated and sintered. The sugar material mass includes for example sugar syrup, sugar or beets, cane sugar, fruits, honey, alcohol-sugar solutions and beer.

6 Claims, No Drawings

METHOD OF MANUFACTURING CERAMIC, METALLIC OR CERAMO-METALLIC, SHAPED BODIES AND LAYERS

This application is a CIP of PCT/DE96/00288 filed Feb. 16, 1996.

BACKGROUND

The invention relates to a method of manufacturing ceramic, metallic or ceramo-metallic bodies and layers using a castable or moldable material mass which is formed into a raw body and then heated and sintered.

EP 0 034 32 discloses a method of making shaped bodies of silicon carbide: First, a liquid or moldable mass is formed into a raw body which is heat-treated and sintered.

However, the use of environmentally harmful solvents is environmentally objectionable.

It is the object of the present invention to provide a simple method of manufacturing shaped bodies or layers which can be performed without harmful effects on the environment.

SUMMARY OF THE INVENTION

In a method of manufacturing ceramic, metallic or ceramo-metallic shaped bodies or layers a castable moldable material mass consisting of sugar and/or urea-containing compounds as well as metal components is produced and from that material mass a shaped body is formed or the material mass is applied to a material structure and the shaped body or material structure is then heated and sintered. The sugar material mass includes for example sugar syrup, sugar beets, can sugar, fruits, honey, alcohol-sugar solutions and beer and the urea-containing compounds include uric acid.

From a material mass comprising sugar and/or urea containing substances as well as the required material components a castable or moldable material mass is made. In addition to the sugar or urea-containing substances those material components must of course be present which are included in the final product (shaped body or, respectively, layer), but not in the sugar or urea containing substances. For example, for the manufacture of silicon carbide the material mass may comprise only sugar and silicon powder since the sugar already contains the material component carbon. Instead of the pure substances also their compounds may be used; for example $SiO_2$ powder may be used instead of pure Si powder. For the reinforcement of the shaped body or the layer to be produced carbon in the form of, for example, polyethylene is added. An additional reinforcement effect is obtained by adding carbon in the form of carbon fibers.

The powder, which includes the material components, is preferably very fine. Powder particles of a size in the order of several 100 or even only several $\mu$ meters are particularly suitable to provide a homogeneous material mass with the desired properties. The powder is mixed with sugar and is cooked in water or alcohol until the desired flow or molding properties are obtained.

From the material mass, the raw body is formed at room temperature or, for the manufacture of a layer, the material mass is applied to the material or body on which such a layer is to be disposed. The material mass may also be applied to a preformed body which consists of metal powder pressed into the shape of the body. In such a case in which the material mass is used as an infiltration medium a solid body rather than a body with a layer thereon is formed.

Generally, it is sufficient to give the body the desired shape at room temperature or, respectively, to apply a layer thereto. The casting or molding capabilities, however, can be increased if desired by performing the last mentioned method step at an increased temperature. If required the molding or the application of a layer occurs under pressure.

The mass of material is applied to another material or body by spreading, pouring, spraying or scattering.

Then the raw body or material with the applied material is temperature-treated and sintered. In this way also composite materials can be produced.

It is known for over hundred years to use sugar as a reduction agent in the manufacture of metals from metal oxides. Also, the manufacture of a mixture of sugar and material components (for example, a metal compound) is known in order to obtain therefrom, by heating of the mixture, the desired material (for example, pure metal). However, to convert such a mixture into a castable or moldable material mass and subsequently form this material mass into a given well-defined shape in order to obtain a shaped body or a layer in an environmentally safe manner has not been known. All the experts have been of the opinion—inspite of an intense search for an environmentally safe process of manufacturing for example bodies of silicon carbide—that it is necessary to use herefor resins and solvents.

In accordance with the invention, the following materials were utilized: Si, SiC, B, $BO_2$, Ti, Zr, $Al_2O_3$, Al, Nb and other compounds. With these compounds molded bodies and layers of carbide, boride, silicide, metals, or metal alloys can be made utilizing one of the methods according to the invention.

The porosity of the material mass can be controlled by the development of gases released during the reaction. By controlling the temperature, the pressure or by the addition of special compounds such as carbon or metals, a desired density can be obtained. With this method even thin membranes or fibers can be produced and cracks and pores in materials can be closed.

In order to produce for example a shaped body of metal a material mass is prepared which consists of sugar and metal oxide. The material mass consisting of metal oxide and sugar is first reduced to metal by heat treatment and sintering.

During this conversion, also $CO_2$ and water are generated (metal oxide+sugar→metal+$CO_2$+$H_2O$). The mass ratio of sugar and metal oxide is to be selected according to the stoichiometry of the reaction equation. If sugar is added to the material mass in excess of the stoichiometric relationship the carbon which, after the reduction, is then present in excess, reacts with the metal formed to generate metal carbide. Accordingly, depending on the amount of sugar used, the body produced comprises either a metal or a metal carbide.

Ceramo-metallic formed bodies are made at suitably selected sintering temperatures and suitable amounts of sugar. For example, a material mass consisting of metal $oxide_1$, metal $oxide_2$ and sugar is prepared. Then, for the reduction of the metal oxide, a sintering-temperature $T_1$ and for the reduction of the metal $oxide_2$, a sintering temperature $T_2$ is required. Assume the sintering temperature $T_1$ is higher then the sintering temperature $T_2$ ($T_1>T_2$). If this material mass is sintered at a temperature between $T_1$ and $T_2$, only the metal $oxide_2$ is reduced to $metal_2$ and a ceramo-metallic shaped body of metal $oxide_1$–$metal_2$ is produced if the sugar amount was selected in accordance with the stoichiometry of the reaction equation.

If sintering takes place at a temperature above $T_1$ and $T_2$ a $metal_1$–$metal_2$ shaped body is produced. If instead of the metal oxide$_1$, a metal carbide, is used, with suitably selected amount of sugar and sintering temperature a metal carbide$_1$–metal$_2$ shaped body is produced.

For manufacturing nitrides, urea is added to the material mass. With metal and urea a metal nitride is produced. With metal oxide, urea and sugar with the appropriate amount of sugar and the appropriate sintering temperature, a metal nitride shaped body is produced.

From a material mass comprising metal, boron, sugar with a suitable selection of the parameters, amount of sugar and sintering temperature a metal carbide-boron carbide shaped body is produced.

DESCRIPTION OF VARIOUS EXAMPLES

EXAMPLE 1

30 g sugar, 300 g metal powder (silicon or titanium) are cooked in water while being stirred at 150° C. for about 30 min. By applying this material mass onto porous materials and heating to about 1700° C. the porous materials are sealed. The materials mass may also be used as an infiltration means.

The material mass is deposited on the ceramic material and heated up to 1700° C. In this way, compound materials are generated as for example Si, SiC-C fibers or Si, SiC-oxidic ceramics with a variable Si content.

C. In this way, compound materials are generated as for example Si, SiC-C fibers or Si, SiC-oxide ceramics with a variable Si content.

EXAMPLE 2

68 g Si powder and 34 g sugar mixed so as to provide a homogeneous material mass is disposed in layers, alternately with a fiber fabric in a pressure mold one on top of the other. It is wetted with water and compressed at a pressure of for example 150 MPa, then dried at 200° C. and finally heated to 400° C. for at least 3 hours. The raw bodies are then removed from the press and heated to 1000° C. for at least 4 hours and subsequently sintered at a temperature of up to 1550° C. depending on the compression pressure a ceramic material of different densities and with different material structure depending on the fabric fibers used in the process is obtained.

EXAMPLE 3

Fiber fabrics are soaked in an aqueous solution of 10 g sugar and 60 g silicon powder and are placed on top of one another in a pressure mold. They are then dried under pressure at 200° C. and then heated to 400° C. for at least 4 hours and finally pyrolized at 1000° C. Sintering takes place at between 1500° C. and 1750° C. In this way, highly temperature resistant plates and tubes can be manufactured.

EXAMPLE 4

40 g sugar and 60 g silicon powder and/or other synthetic, natural and carbon fibers are boiled in water until a still moist but solid mixture is obtained. The mixture is filled into a pressure molding tool and compressed at about 120 MPa. It is then slowly heated and sintered at 1750° C. In this way, depending on the pressure, silicon carbides of different densities can be produced. The properties (for example, mechanical, thermal, electrical) of the ceramics produced in this way can be influenced by the addition of other ceramic and metallic additives (Mo, Si$_2$, Ti, W, oxides) in small amounts such as 5 g.

These sugar mixtures can also be made into various raw shaped bodies and sintered in ceramic molds.

EXAMPLE 5

For making metal bodies consisting of copper, aluminum, silver, gold, platinum, etc., 100 g metal and 5 to 90 g sugar (or sugar solution) were mixed, pressed and sintered. For achieving higher densities smaller amounts of sugar and for achieving lower densities greater amounts of sugar were added. The heating or, respectively, sintering temperature is metal specific and depends on whether the sintering process takes place under vacuum, in air or in a gas atmosphere such as hydrogen. The heating or, respectively, sintering temperature was therefore, depending on the selection of the materials, between 100–500° C. or higher at about 2000° C.

For the manufacture of ceramic bodies which contain metal components such as ions or metals which form a compound in ceramic bodies or which are present for example in a pure metallic state (such as MeSiO$_2$, MeSiC, MeTiO$_2$, MeTiO$_4$, MeZrO$_4$, or similar) metal powders and sugar or respectively, a sugar solution are formed to a mass at a temperature which is at or above the decomposition temperature of the vacuum products generated and the mass is sintered under pressure or without pressure. Pure metals as well as their chemical compounds were utilized which are fully or partially reduced at higher temperatures.

For manufacturing metal silizides and for the conversion of metals in ceramic bodies to silizides, metal power is formed into pressed articles or bodies and a paste of silicon and sugar solution is applied to them. By infiltration and sintering between 1400° C. and 2500° C. either pure metal silizide bodies or ceramics with silizides are produced.

EXAMPLE 6

For example 10 g molybdenum-, titanium-, or tungsten powder or another metal powder was mixed with 100 g silicon carbide powder, compressed into pressed articles and a paste of silicon and sugar solution was applied thereto and the articles are then heated to 1400° C. to 1800° C. By infiltration silicon carbide-molydenum-silized ceramics with good physical and mechanical properties were obtained.

EXAMPLE 7

For the manufacture of boride and boron carbide bodies a mass of boron powder and sugar solution was prepared and applied to a metal or graphite body or a metal-graphite or metal-ceramic body and permitted to infiltrate. The body was then sintered.

The treatment temperatures were between 600° C. and 1800° C. in this way, silicon carbide, boron carbide and also ceramic bodies with boron carbide and silicon carbide layer could be produced.

With sugar and metals or respectively, inorganic compounds with a high degree of purity, optical and electrical fine-ceramics can be produced.

What is claimed is:

1. A method for the manufacture of ceramic, metallic or ceramo-metallic shaped bodies comprising the steps of:
providing a castable or moldable material mass consisting of substances comprising at least one of sugar and urea-containing compounds as well as metal containing components but essentially no metal carbides, said material mass being free of NH$_3$,
forming the material mass in a predetermined manner into raw shaped bodies, and heating the raw shaped bodies whereby said metal containing components in said bodies react with the sugar or urea chemically in such a way that said metal components are converted to one of ceramic, metallic or ceramo-metallic compounds which, in the same heating step, are sintered to provide said shaped bodies.

2. A method according to claim 1, wherein said substances include at least one of the group comprising sugar syrup, sugar beets, cane sugar, fruits, honey, alcohol-sugar solution, beer and uric acid.

3. A method according to claim 1, wherein carbon or carbon fibers are admixed to said material mass.

4. A method for the manufacture of ceramic, metallic or ceramo-metallic layers on a material structure comprising the steps of:

providing a castable or moldable material mass consisting of substances comprising at least sugar and urea containing compounds and metal components but essentially no metal carbides, said material mass being free of $NH_3$, applying said material mass to said material structure, and heating said material structure with said material mass thereon, whereby during heating at least one metal component reacts chemically with the sugar or urea such that at least said one metal component is converted to one of a ceramic, metallic or ceramo-metallic compound which, in the same heating step, is sintered to provide said layers on a material structure.

5. A method according to claim 4, wherein said substance include at least one of the group comprising sugar syrup, sugar beets, can sugar, fruits, honey, alcohol-sugar solution, beer and uric acid.

6. A method according to claim 4, wherein carbon or carbon fibers are admixed to said material mass.

\* \* \* \* \*